(12) United States Patent
Auyeung et al.

(10) Patent No.: US 10,460,634 B2
(45) Date of Patent: Oct. 29, 2019

(54) LED LIGHT ASSEMBLY WITH TRANSPARENT SUBSTRATE HAVING ARRAY OF LENSES FOR PROJECTING LIGHT TO ILLUMINATE AN AREA

(71) Applicant: Ultravision Technologies, LLC, Dallas, TX (US)

(72) Inventors: David Siucheong Auyeung, Carrollton, TX (US); William Y Hall, Dallas, TX (US); Simon Magarill, Mountain View, CA (US)

(73) Assignee: Ultravision Technologies, LLC, Dallas, TX (US)

( * ) Notice: Subject to any disclaimer, the term of this patent is extended or adjusted under 35 U.S.C. 154(b) by 0 days.

(21) Appl. No.: 16/241,067

(22) Filed: Jan. 7, 2019

(65) Prior Publication Data

US 2019/0139465 A1     May 9, 2019

Related U.S. Application Data

(60) Division of application No. 15/969,511, filed on May 2, 2018, now Pat. No. 10,223,946, which is a
(Continued)

(51) Int. Cl.
*G09F 13/02* (2006.01)
*G09F 13/22* (2006.01)
(Continued)

(52) U.S. Cl.
CPC .............. *G09F 13/22* (2013.01); *F21K 9/60* (2016.08); *F21S 6/006* (2013.01); *F21V 5/007* (2013.01); *F21V 19/003* (2013.01); *F21V 21/26* (2013.01); *F21V 23/002* (2013.01); *F21V 29/00* (2013.01); *F21V 29/15* (2015.01); *F21V 29/503* (2015.01); *F21V 29/70* (2015.01); *F21V 29/74* (2015.01); *F21V 29/745* (2015.01); *F21V 29/76* (2015.01); *F21V 29/763* (2015.01); *F21V 29/83* (2015.01); *F21V 29/89* (2015.01); *F21V 31/00* (2013.01); *F21V 31/005* (2013.01); *F21V 33/00* (2013.01); *G09F 13/02* (2013.01); *G09F 15/00* (2013.01); *G09F 15/005* (2013.01);
(Continued)

(58) Field of Classification Search
CPC ...... F21Y 2105/001; F21S 4/008; F21V 5/08; F21V 5/45; F21V 29/004; F21V 29/74; F21V 29/745; F21V 29/76; G09F 13/02; G02F 1/133603
See application file for complete search history.

(56) References Cited

U.S. PATENT DOCUMENTS

| 2,254,961 A | 9/1941 | Lawrence et al. |
| 4,235,285 A | 11/1980 | Johnson et al. |

(Continued)

*Primary Examiner* — Ismael Negron
(74) *Attorney, Agent, or Firm* — Slater Matsil, LLP

(57) ABSTRACT

A light assembly includes a thermally conductive support structure, a plurality of light emitting diodes (LEDs) attached to a circuit board and thermally coupled to a heat sink and a single transparent substrate with a corresponding plurality of optical elements over the LEDs. Each of the optical elements include a first portion configured to direct light in a second direction, a second portion configured to direct light in a second lateral direction, and a third portion configured to direct light in a third direction.

23 Claims, 13 Drawing Sheets

Related U.S. Application Data continuation of application No. 15/627,089, filed on Jun. 19, 2017, which is a continuation of application No. 15/429,320, filed on Feb. 10, 2017, now Pat. No. 9,685,102, which is a continuation of application No. 15/216,562, filed on Jul. 21, 2016, now Pat. No. 9,659,511, which is a division of application No. 14/968,520, filed on Dec. 14, 2015, now Pat. No. 9,589,488, which is a division of application No. 14/706,634, filed on May 7, 2015, now Pat. No. 9,212,803, which is a continuation of application No. 14/630,500, filed on Feb. 24, 2015, now Pat. No. 9,812,043, which is a continuation of application No. 13/836,517, filed on Mar. 15, 2013, now Pat. No. 8,974,077.

(60) Provisional application No. 61/677,346, filed on Jul. 30, 2012.

(51) Int. Cl.

| | | |
|---|---|---|
| *F21V 5/00* | (2018.01) | |
| *F21V 29/74* | (2015.01) | |
| *F21V 29/00* | (2015.01) | |
| *F21V 29/15* | (2015.01) | |
| *F21V 33/00* | (2006.01) | |
| *G09F 15/00* | (2006.01) | |
| *F21S 6/00* | (2006.01) | |
| *F21V 29/503* | (2015.01) | |
| *F21V 29/76* | (2015.01) | |
| *F21K 9/60* | (2016.01) | |
| *F21V 29/83* | (2015.01) | |
| *F21V 31/00* | (2006.01) | |
| *F21V 29/89* | (2015.01) | |
| *F21V 29/70* | (2015.01) | |
| *F21V 19/00* | (2006.01) | |
| *F21V 21/26* | (2006.01) | |
| *F21V 23/00* | (2015.01) | |
| *G02B 19/00* | (2006.01) | |
| *F21W 131/40* | (2006.01) | |
| *F21Y 101/00* | (2016.01) | |
| *F21Y 105/12* | (2016.01) | |
| *F21Y 105/10* | (2016.01) | |
| *F21Y 115/10* | (2016.01) | |
| *F21Y 105/16* | (2016.01) | |
| *F21W 131/10* | (2006.01) | |

(52) U.S. Cl.
CPC ..... *G09F 15/0037* (2013.01); *F21W 2131/10* (2013.01); *F21W 2131/40* (2013.01); *F21Y 2101/00* (2013.01); *F21Y 2105/10* (2016.08); *F21Y 2105/12* (2016.08); *F21Y 2105/16* (2016.08); *F21Y 2115/10* (2016.08); *G02B 19/0014* (2013.01); *G02B 19/0028* (2013.01); *G02B 19/0061* (2013.01); *G02B 19/0066* (2013.01); *G09F 2013/222* (2013.01)

(56) References Cited

U.S. PATENT DOCUMENTS

| | | | |
|---|---|---|---|
| 4,679,118 | A | 7/1987 | Johnson et al. |
| 5,036,248 | A | 7/1991 | McEwan et al. |
| 5,083,194 | A | 1/1992 | Bartilson |
| 5,329,426 | A | 7/1994 | Villani |
| 5,384,940 | A | 1/1995 | Soule et al. |
| 5,803,579 | A | 9/1998 | Turnbull et al. |
| 5,818,640 | A | 10/1998 | Watanabe et al. |
| 5,857,767 | A | 1/1999 | Hochstein |
| 5,896,093 | A | 4/1999 | Sjobom |
| 5,924,788 | A | 7/1999 | Parkyn, Jr. |
| 5,926,320 | A | 7/1999 | Parkyn, Jr. et al. |
| 6,045,240 | A | 4/2000 | Hochstein |
| 6,274,924 | B1 | 8/2001 | Carey et al. |
| 6,364,507 | B1 | 4/2002 | Yang |
| 6,428,189 | B1 | 8/2002 | Hochstein |
| 6,517,218 | B2 | 2/2003 | Hochstein |
| 6,536,923 | B1 | 3/2003 | Merz |
| 6,547,423 | B2 | 4/2003 | Marshall et al. |
| 6,582,103 | B1 | 6/2003 | Popovich |
| 6,607,286 | B2 | 8/2003 | West et al. |
| 6,674,096 | B2 | 1/2004 | Sommers |
| 6,741,351 | B2 | 5/2004 | Marshall et al. |
| 6,783,269 | B2 | 8/2004 | Pashley et al. |
| 6,784,603 | B2 | 8/2004 | Pelka et al. |
| 6,799,864 | B2 | 10/2004 | Bohler et al. |
| 6,837,605 | B2 | 1/2005 | Reill |
| 6,864,513 | B2 | 3/2005 | Lin et al. |
| 6,896,381 | B2 | 5/2005 | Benitez et al. |
| 6,918,684 | B2 | 7/2005 | Harvey |
| 6,948,838 | B2 | 9/2005 | Kunstler |
| 7,006,306 | B2 | 2/2006 | Falicoff et al. |
| 7,009,213 | B2 | 3/2006 | Camras et al. |
| 7,034,343 | B1 * | 4/2006 | Kim .............. H01L 33/54 257/79 |
| 7,048,400 | B2 | 5/2006 | Murasko et al. |
| 7,111,964 | B2 * | 9/2006 | Suehiro ............ G02B 6/0018 257/98 |
| 7,118,236 | B2 | 10/2006 | Hahm et al. |
| 7,144,135 | B2 | 12/2006 | Martin et al. |
| 7,153,002 | B2 | 12/2006 | Kim et al. |
| 7,159,997 | B2 | 1/2007 | Reo et al. |
| 7,246,931 | B2 | 7/2007 | Hsieh et al. |
| 7,336,195 | B2 | 2/2008 | van de Ven |
| 7,339,202 | B2 | 3/2008 | Chiu et al. |
| 7,374,306 | B2 | 5/2008 | Liu |
| 7,374,316 | B2 | 5/2008 | Kuo et al. |
| 7,375,381 | B2 | 5/2008 | Shimizu et al. |
| 7,390,117 | B2 | 6/2008 | Leatherdale et al. |
| 7,396,146 | B2 | 7/2008 | Wang |
| 7,410,275 | B2 | 8/2008 | Sommers et al. |
| 7,434,964 | B1 | 10/2008 | Zheng et al. |
| 7,458,706 | B1 | 12/2008 | Liu et al. |
| 7,478,915 | B1 | 1/2009 | Pedersen |
| 7,513,639 | B2 | 4/2009 | Wang |
| 7,513,653 | B1 | 4/2009 | Liu et al. |
| 7,549,777 | B2 | 6/2009 | Huang |
| 7,572,654 | B2 | 8/2009 | Chang |
| 7,618,162 | B1 | 11/2009 | Parkyn et al. |
| 7,618,163 | B2 | 11/2009 | Wilcox |
| 7,637,630 | B2 * | 12/2009 | Wilcox .............. F21V 5/04 362/158 |
| 7,648,257 | B2 | 1/2010 | Villard |
| 7,654,684 | B1 | 2/2010 | Wight et al. |
| 7,654,701 | B2 | 2/2010 | Zhang et al. |
| 7,665,862 | B2 | 2/2010 | Villard |
| 7,674,019 | B2 | 3/2010 | Parkyn et al. |
| 7,686,469 | B2 | 3/2010 | Ruud et al. |
| 7,722,224 | B1 | 5/2010 | Coleman et al. |
| 7,736,019 | B2 | 6/2010 | Shimada et al. |
| 7,748,863 | B1 | 7/2010 | Holman et al. |
| 7,753,561 | B2 | 7/2010 | Chaves et al. |
| 7,753,564 | B2 | 7/2010 | Cheng et al. |
| 7,794,114 | B2 | 9/2010 | Medendorp, Jr. |
| 7,794,117 | B2 * | 9/2010 | Cheng ................ F21V 5/007 362/326 |
| 7,824,070 | B2 | 11/2010 | Higley et al. |
| 7,841,750 | B2 | 11/2010 | Wilcox et al. |
| 7,857,483 | B2 | 12/2010 | Storch et al. |
| 7,862,195 | B2 | 1/2011 | Stack et al. |
| 7,866,851 | B2 | 1/2011 | Chang |
| 7,896,522 | B2 | 3/2011 | Heller et al. |
| 7,905,634 | B2 | 3/2011 | Agurok et al. |
| 7,918,590 | B1 * | 4/2011 | Li ................ F21V 5/007 362/311.02 |
| 7,942,559 | B2 | 5/2011 | Holder et al. |
| 7,952,262 | B2 | 5/2011 | Wilcox et al. |
| 7,959,326 | B2 | 6/2011 | Laporte |

(56) References Cited

U.S. PATENT DOCUMENTS

| | | | |
|---|---|---|---|
| 7,963,672 B2* | 6/2011 | Liu | F21V 17/101 |
| | | | 362/249.02 |
| 7,980,733 B2 | 7/2011 | Shih et al. | |
| 7,997,761 B2 | 8/2011 | Peck et al. | |
| 8,002,435 B2 | 8/2011 | Laporte | |
| 8,007,127 B2* | 8/2011 | Kim | F21V 5/04 |
| | | | 362/218 |
| 8,035,119 B2 | 10/2011 | Ng et al. | |
| 8,052,303 B2 | 11/2011 | Lo et al. | |
| 8,056,614 B2 | 11/2011 | Chen et al. | |
| 8,061,869 B2 | 11/2011 | Lo | |
| 8,092,049 B2 | 1/2012 | Kinnune et al. | |
| 8,100,552 B2 | 1/2012 | Spero | |
| 8,100,560 B2* | 1/2012 | Ahland, III | F21V 7/0083 |
| | | | 362/267 |
| 8,101,434 B2 | 1/2012 | Guillien et al. | |
| 8,192,048 B2 | 6/2012 | Kristoffersen et al. | |
| 8,201,970 B2 | 6/2012 | Wang et al. | |
| 8,210,723 B2 | 7/2012 | Peck et al. | |
| 8,215,814 B2 | 7/2012 | Marcoux | |
| 8,235,546 B2 | 8/2012 | Takasago et al. | |
| 8,235,553 B2 | 8/2012 | Minami et al. | |
| 8,246,219 B2 | 8/2012 | Teng et al. | |
| 8,256,919 B2 | 9/2012 | Holder et al. | |
| 8,262,252 B2 | 9/2012 | Bergman et al. | |
| 8,267,551 B2 | 9/2012 | Lin | |
| 8,273,158 B2 | 9/2012 | Jarrier et al. | |
| 8,308,331 B2 | 11/2012 | Loh | |
| 8,310,158 B2 | 11/2012 | Coplin et al. | |
| 8,330,387 B2 | 12/2012 | York et al. | |
| 8,338,841 B2 | 12/2012 | Lerman et al. | |
| 8,342,709 B2 | 1/2013 | Lueken et al. | |
| 8,348,461 B2 | 1/2013 | Wilcox et al. | |
| 8,360,613 B2 | 1/2013 | Little, Jr. | |
| 8,376,585 B2 | 2/2013 | Noeth | |
| 8,393,101 B2 | 3/2013 | Knight et al. | |
| 8,408,737 B2 | 4/2013 | Wright et al. | |
| 8,419,217 B2* | 4/2013 | Lu | F21V 29/2212 |
| | | | 362/249.02 |
| 8,444,297 B2 | 5/2013 | Lee et al. | |
| 8,454,194 B2 | 6/2013 | Liu | |
| 8,454,215 B2 | 6/2013 | Bollmann | |
| 8,465,178 B2 | 6/2013 | Wilcox et al. | |
| 8,469,552 B2 | 6/2013 | Moeller | |
| 8,476,650 B2 | 7/2013 | Liao | |
| 8,529,085 B2 | 9/2013 | Josefowicz et al. | |
| 8,545,049 B2 | 10/2013 | Davis et al. | |
| 8,547,023 B2 | 10/2013 | Chang et al. | |
| 8,567,987 B2 | 10/2013 | Wronski | |
| 8,573,815 B2 | 11/2013 | Mallory et al. | |
| 8,577,434 B2 | 11/2013 | Merchant et al. | |
| 8,585,253 B2 | 11/2013 | Duong et al. | |
| 8,602,594 B2* | 12/2013 | Jeon | F21S 2/005 |
| | | | 362/249.02 |
| 8,602,599 B2 | 12/2013 | Zimmer et al. | |
| 8,602,609 B2* | 12/2013 | Yun | F21V 5/007 |
| | | | 362/373 |
| 8,610,357 B2 | 12/2013 | Stoll et al. | |
| 8,622,572 B2 | 1/2014 | Morgan | |
| 8,622,574 B2 | 1/2014 | Liu | |
| 8,628,217 B2 | 1/2014 | Moshtagh | |
| 8,632,225 B2 | 1/2014 | Koo et al. | |
| 8,635,049 B2 | 1/2014 | Kauffman et al. | |
| 8,651,693 B2 | 2/2014 | Josefowicz et al. | |
| 8,662,704 B2 | 3/2014 | Carraher et al. | |
| 8,733,981 B2 | 5/2014 | Jiang et al. | |
| 8,789,967 B2 | 7/2014 | Gordin et al. | |
| 8,801,221 B2 | 8/2014 | Lin et al. | |
| 8,814,396 B2 | 8/2014 | Ishida et al. | |
| 8,824,125 B1 | 9/2014 | Cox et al. | |
| 8,835,958 B2 | 9/2014 | Hsieh | |
| 8,845,129 B1 | 9/2014 | Holder et al. | |
| 8,858,024 B2 | 10/2014 | Wu et al. | |
| 8,858,028 B2 | 10/2014 | Kim | |
| 8,864,334 B2 | 10/2014 | Swafford, Jr. et al. | |
| 8,864,344 B2 | 10/2014 | Jiang et al. | |
| 8,870,410 B2 | 10/2014 | Auyeung | |
| 8,870,413 B2 | 10/2014 | Auyeung | |
| 8,876,325 B2 | 11/2014 | Lu et al. | |
| 8,899,784 B2 | 12/2014 | Meyer et al. | |
| 8,911,160 B2 | 12/2014 | Seo et al. | |
| 8,922,734 B2 | 12/2014 | Lin | |
| 8,931,928 B2 | 1/2015 | Heintz | |
| 8,931,934 B2 | 1/2015 | Lin | |
| 8,950,921 B2 | 2/2015 | Sheng | |
| 8,956,018 B2 | 2/2015 | Deshpande et al. | |
| 9,028,097 B2 | 5/2015 | Wilcox | |
| 9,046,293 B2 | 6/2015 | Pelka et al. | |
| 9,182,101 B2 | 11/2015 | Nakamura et al. | |
| 9,434,151 B2 | 9/2016 | Tanaka | |
| 9,464,790 B2 | 10/2016 | Badley et al. | |
| 9,523,491 B2 | 12/2016 | Bailey et al. | |
| 9,589,488 B2* | 3/2017 | Auyeung | F21S 6/006 |
| 9,651,218 B2 | 5/2017 | Gattari | |
| 9,659,511 B2* | 5/2017 | Auyeung | F21S 6/006 |
| 9,699,854 B2 | 7/2017 | Wassel | |
| 9,739,462 B2 | 8/2017 | Georgitsis et al. | |
| 9,752,749 B2 | 9/2017 | Adams | |
| 9,791,116 B2 | 10/2017 | Mrakovich et al. | |
| 9,822,952 B2 | 11/2017 | Farmer et al. | |
| 9,857,051 B2 | 1/2018 | Ikeda et al. | |
| 10,012,375 B1 | 7/2018 | Salessi | |
| 2003/0099105 A1 | 5/2003 | Watson | |
| 2004/0004827 A1 | 1/2004 | Guest | |
| 2005/0018428 A1 | 1/2005 | Harvey | |
| 2005/0047170 A1 | 3/2005 | Hilburger et al. | |
| 2005/0128752 A1 | 6/2005 | Ewington et al. | |
| 2005/0151141 A1 | 7/2005 | Grotsch et al. | |
| 2006/0076568 A1 | 4/2006 | Keller et al. | |
| 2006/0081863 A1 | 4/2006 | Kim et al. | |
| 2006/0146531 A1 | 7/2006 | Reo et al. | |
| 2006/0245083 A1 | 11/2006 | Chou et al. | |
| 2007/0201225 A1 | 8/2007 | Holder et al. | |
| 2007/0257270 A1 | 11/2007 | Lu et al. | |
| 2007/0279904 A1 | 12/2007 | Tasch et al. | |
| 2008/0073663 A1 | 3/2008 | Chang | |
| 2008/0080179 A1 | 4/2008 | Giorgi | |
| 2008/0084693 A1 | 4/2008 | Shimada et al. | |
| 2008/0084701 A1 | 4/2008 | Van De Ven et al. | |
| 2008/0180014 A1 | 7/2008 | Tzeng et al. | |
| 2008/0212319 A1 | 9/2008 | Klipstein | |
| 2008/0247173 A1 | 10/2008 | Danek et al. | |
| 2008/0273327 A1 | 11/2008 | Wilcox et al. | |
| 2009/0097265 A1 | 4/2009 | Sun et al. | |
| 2009/0154158 A1 | 6/2009 | Cheng et al. | |
| 2009/0180281 A1 | 7/2009 | Ahland, III et al. | |
| 2009/0256459 A1 | 10/2009 | Liu | |
| 2009/0262532 A1 | 10/2009 | Wilcox et al. | |
| 2009/0267474 A1 | 10/2009 | Zhou et al. | |
| 2009/0273933 A1 | 11/2009 | Woodward et al. | |
| 2009/0290338 A1 | 11/2009 | Heller et al. | |
| 2009/0296407 A1 | 12/2009 | Bailey | |
| 2009/0303711 A1 | 12/2009 | Remus et al. | |
| 2010/0008094 A1 | 1/2010 | Shuai et al. | |
| 2010/0014289 A1 | 1/2010 | Thomas et al. | |
| 2010/0014290 A1 | 1/2010 | Wilcox | |
| 2010/0027271 A1 | 2/2010 | Wilcox et al. | |
| 2010/0039810 A1 | 2/2010 | Holder et al. | |
| 2010/0046225 A1 | 2/2010 | Zheng | |
| 2010/0085774 A1 | 4/2010 | Park | |
| 2010/0118531 A1 | 5/2010 | Montagne | |
| 2010/0128488 A1 | 5/2010 | Marcoux | |
| 2010/0148673 A1 | 6/2010 | Stewart et al. | |
| 2010/0149801 A1 | 6/2010 | Lo et al. | |
| 2010/0172135 A1 | 7/2010 | Holder et al. | |
| 2010/0195330 A1 | 8/2010 | Schaefer et al. | |
| 2010/0232155 A1 | 9/2010 | Wang | |
| 2010/0296267 A1 | 11/2010 | Yu et al. | |
| 2010/0296283 A1 | 11/2010 | Taskar et al. | |
| 2010/0302785 A1 | 12/2010 | Zhou | |
| 2010/0302786 A1 | 12/2010 | Wilcox et al. | |
| 2011/0002120 A1 | 1/2011 | Song et al. | |
| 2011/0031887 A1 | 2/2011 | Stoll et al. | |

(56) References Cited

U.S. PATENT DOCUMENTS

| | | |
|---|---|---|
| 2011/0038151 A1 | 2/2011 | Carraher et al. |
| 2011/0063857 A1 | 3/2011 | Li et al. |
| 2011/0068708 A1 | 3/2011 | Coplin et al. |
| 2011/0075409 A1 | 3/2011 | Zheng |
| 2011/0149548 A1 | 6/2011 | Yang et al. |
| 2011/0170283 A1 | 7/2011 | Chan |
| 2011/0205744 A1 | 8/2011 | Kim |
| 2011/0219650 A1 | 9/2011 | Wright et al. |
| 2011/0242807 A1 | 10/2011 | Little, Jr. et al. |
| 2011/0242816 A1 | 10/2011 | Chowdhury et al. |
| 2011/0278633 A1 | 11/2011 | Clifford |
| 2011/0280003 A1 | 11/2011 | Hsu et al. |
| 2012/0014115 A1 | 1/2012 | Park et al. |
| 2012/0043560 A1 | 2/2012 | Wu et al. |
| 2012/0080699 A1 | 4/2012 | Chowdhury et al. |
| 2012/0087125 A1 | 4/2012 | Liu |
| 2012/0163005 A1 | 6/2012 | Liu |
| 2012/0192486 A1 | 8/2012 | Shanahan et al. |
| 2012/0201022 A1 | 8/2012 | van de Ven et al. |
| 2012/0250321 A1 | 10/2012 | Blincoe et al. |
| 2012/0307495 A1 | 12/2012 | Shih |
| 2013/0010468 A1 | 1/2013 | Stoll et al. |
| 2013/0057861 A1 | 3/2013 | Ishii et al. |
| 2013/0063970 A1 | 3/2013 | Oh |
| 2013/0120991 A1 | 5/2013 | Wohlgemuth et al. |
| 2013/0135861 A1 | 5/2013 | Chen et al. |
| 2013/0163005 A1 | 6/2013 | Tsang |
| 2013/0193850 A1 | 8/2013 | Demuynck et al. |
| 2013/0270585 A1 | 10/2013 | Mei et al. |
| 2013/0291414 A1 | 11/2013 | Cegnar |
| 2013/0335979 A1 | 12/2013 | Lauret et al. |
| 2014/0016326 A1 | 1/2014 | Dieker et al. |
| 2014/0029253 A1 | 1/2014 | Auyeung |
| 2014/0029259 A1 | 1/2014 | Auyeung |
| 2014/0029274 A1 | 1/2014 | Auyeung |
| 2014/0085905 A1 | 3/2014 | Broughton |
| 2014/0104851 A1 | 4/2014 | Auyeung |
| 2014/0112007 A1 | 4/2014 | Auyeung |
| 2014/0168963 A1 | 6/2014 | Stone et al. |
| 2014/0168998 A1 | 6/2014 | Tang et al. |
| 2014/0268761 A1 | 9/2014 | Raleigh et al. |
| 2014/0293619 A1 | 10/2014 | Feng et al. |
| 2014/0373348 A1 | 12/2014 | Li |
| 2017/0321869 A1 | 11/2017 | Bryant |

\* cited by examiner

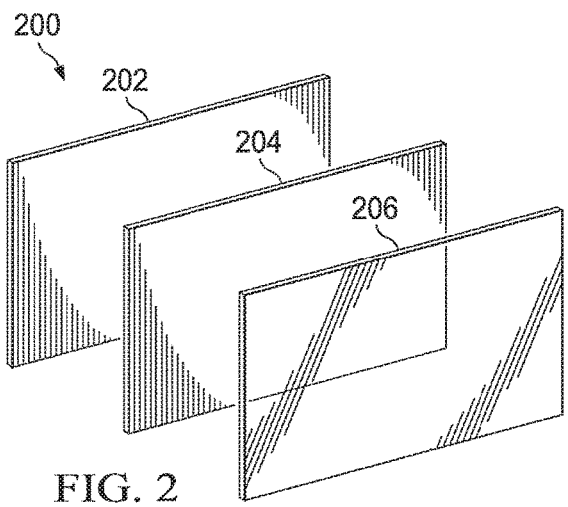
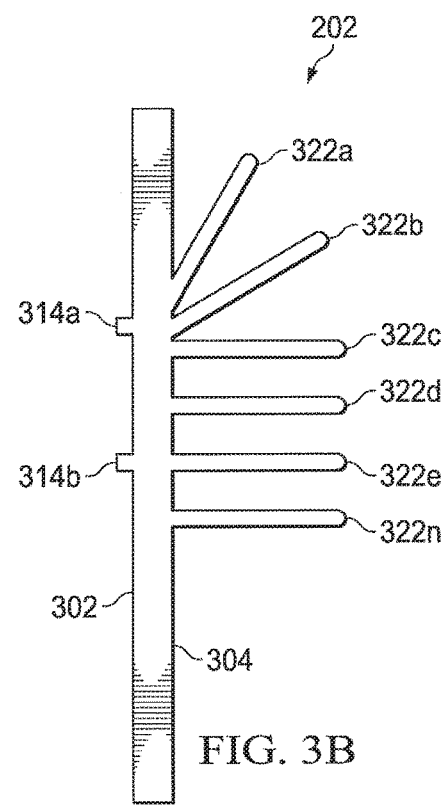
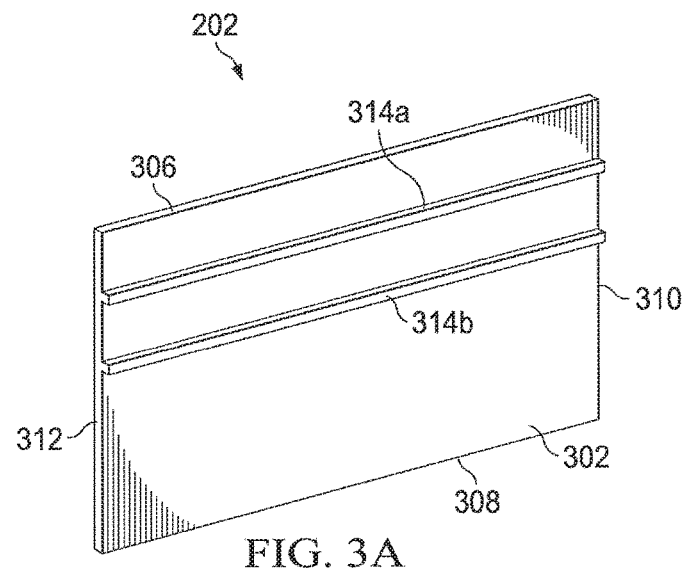

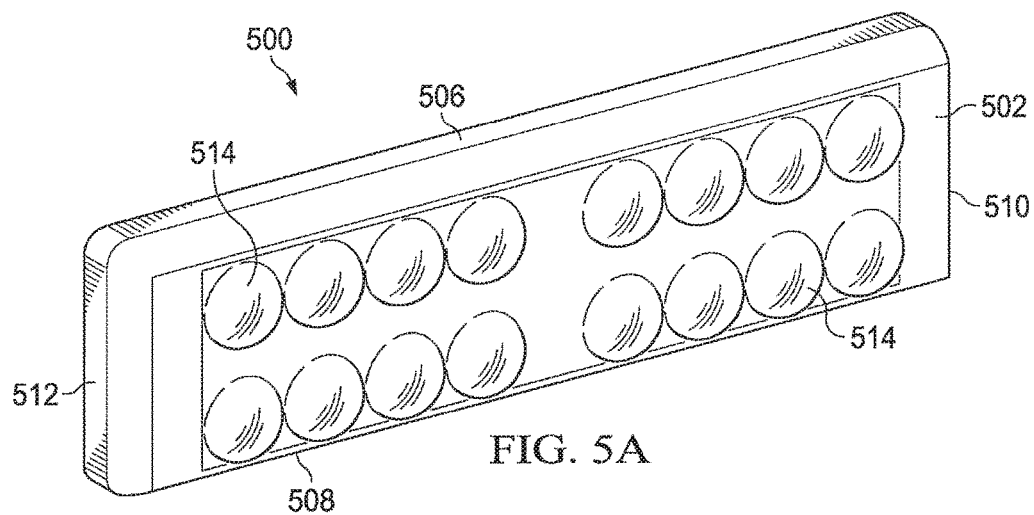
FIG. 5A
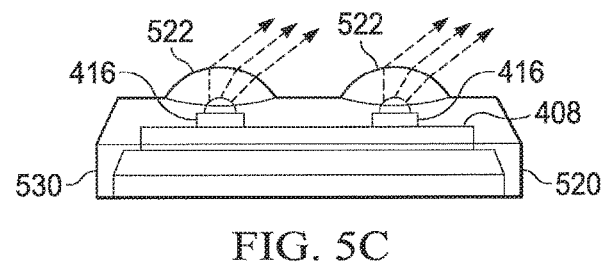
FIG. 5C
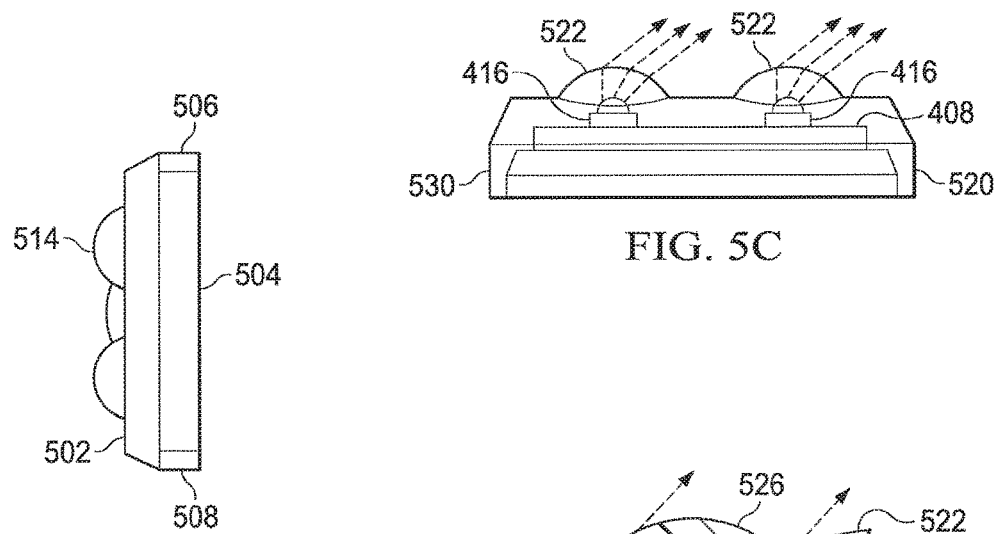
FIG. 5B
FIG. 5D

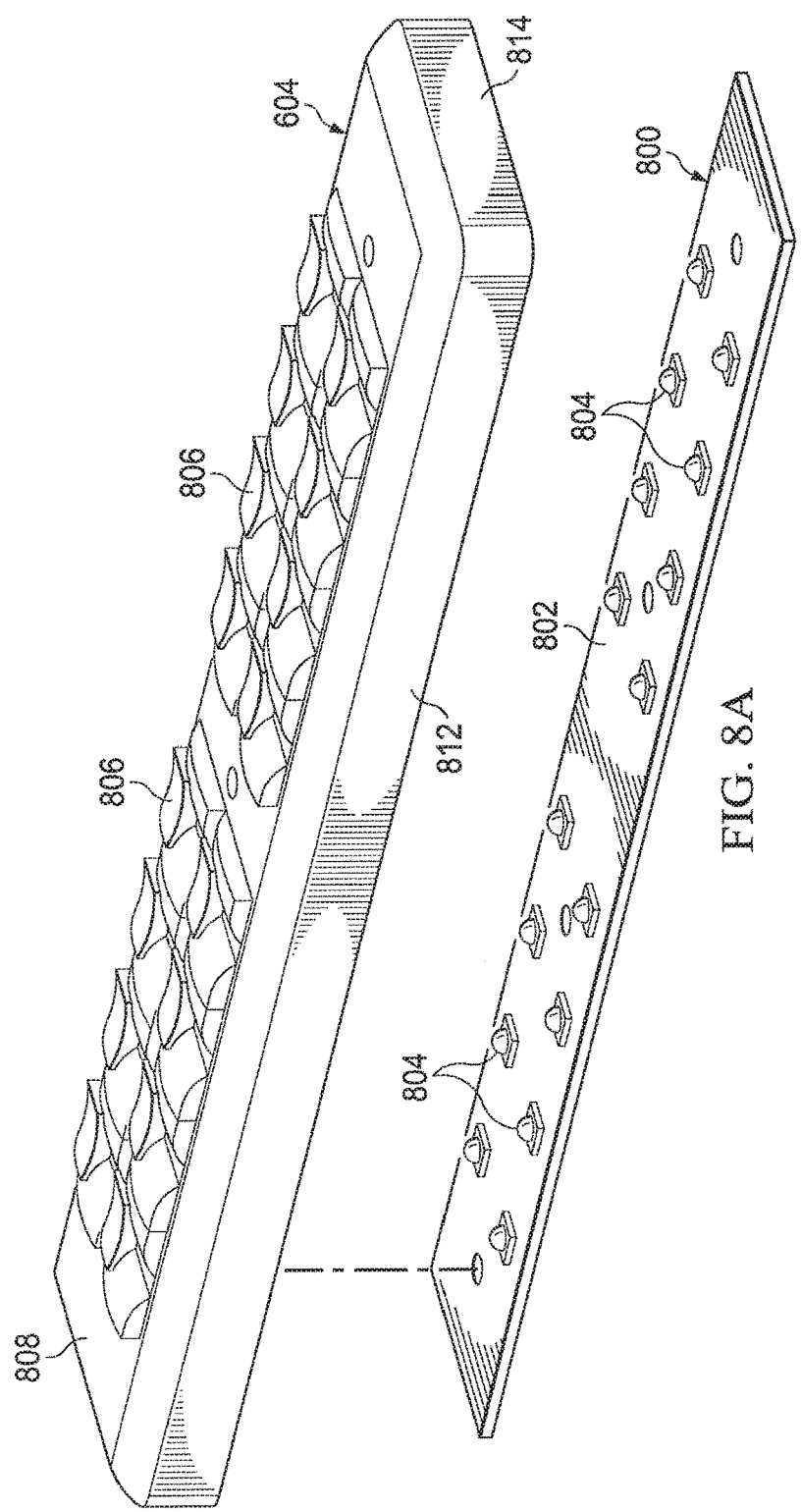

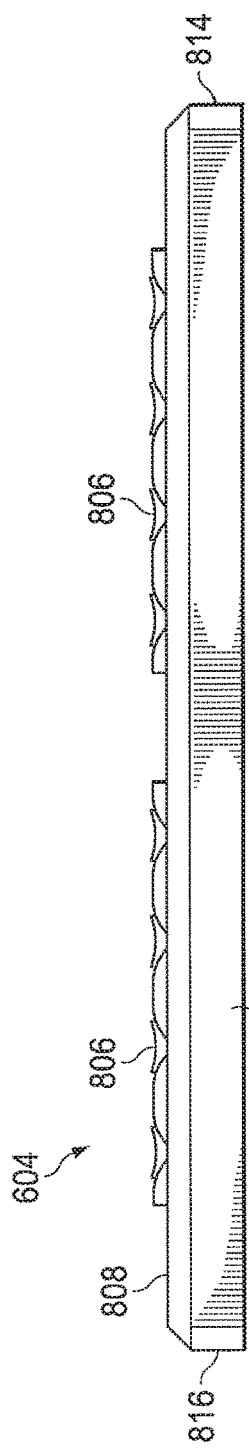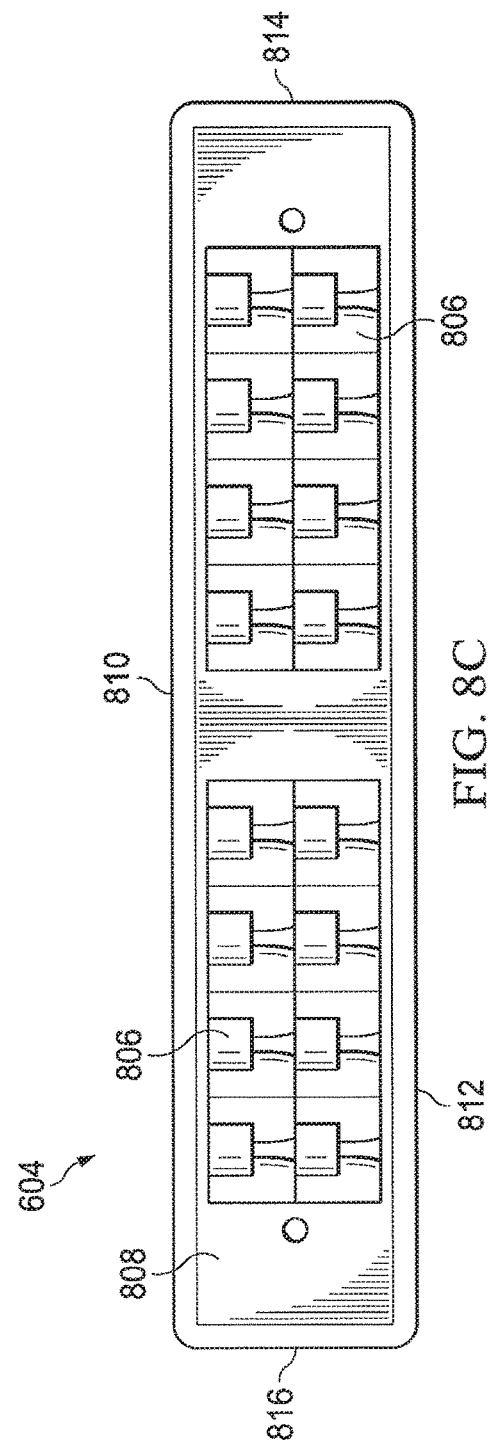

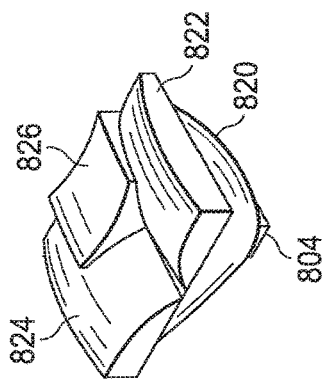
FIG. 8G
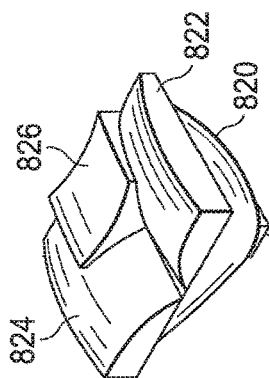
FIG. 8F
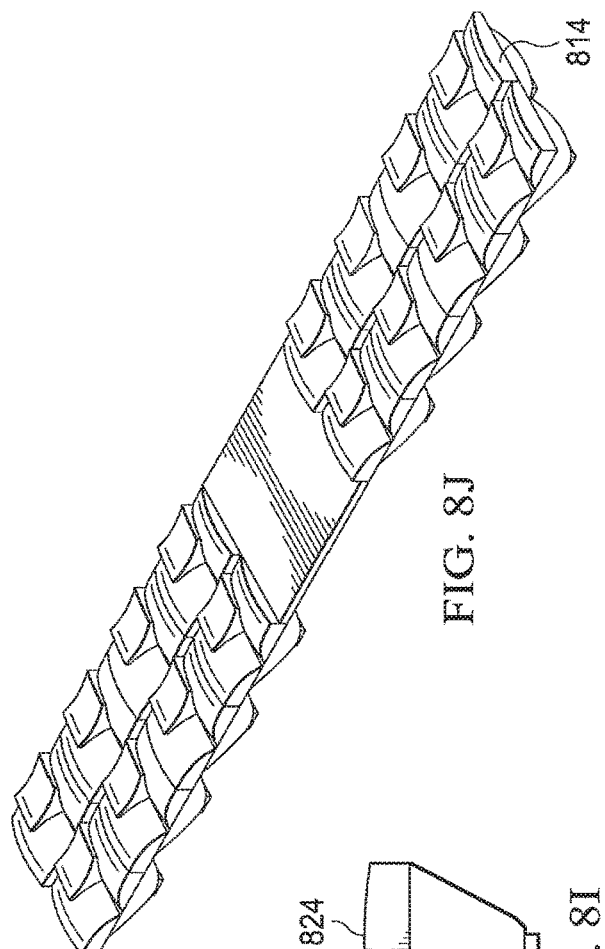
FIG. 8J
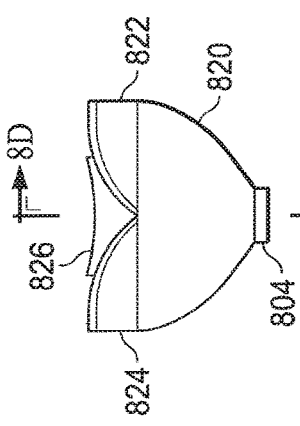
FIG. 8E
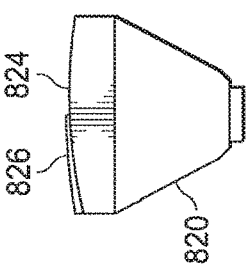
FIG. 8I
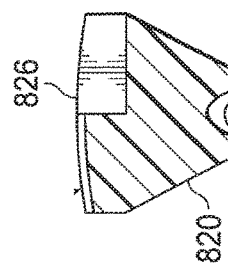
FIG. 8D
FIG. 8H

LED LIGHT ASSEMBLY WITH TRANSPARENT SUBSTRATE HAVING ARRAY OF LENSES FOR PROJECTING LIGHT TO ILLUMINATE AN AREA

CROSS-REFERENCE TO RELATED APPLICATIONS

This is a divisional of U.S. patent application Ser. No. 15/969,511, filed May 2, 2018, which is a continuation of U.S. patent application Ser. No. 15/627,089, filed Jun. 19, 2017, which is a continuation of U.S. patent application Ser. No. 15/429,320, filed Feb. 10, 2017, which is a continuation of U.S. patent application Ser. No. 15/216,562, filed Jul. 21, 2016, which is a divisional of U.S. patent application Ser. No. 14/968,520, filed Dec. 14, 2015, which is a division of U.S. patent application Ser. No. 14/706,634, filed May 7, 2015, which is a continuation of U.S. patent application Ser. No. 14/630,500, filed Feb. 24, 2015, which is a continuation of U.S. patent application Ser. No. 13/836,517, filed Mar. 15, 2013, which claims the benefit of U.S. Provisional Application No. 61/677,346, filed on Jul. 30, 2012, which applications are all hereby incorporated herein by reference.

The following patents and applications are related:
U.S. Pat. Appl. No. 61/677,340, filed Jul. 20, 2012
U.S. Pat. Appl. No. 61/677,346, filed Jul. 30, 2012
U.S. Pat. Appl. No. 61/677,352, filed Jul. 30, 2012
U.S. patent application Ser. No. 13/836,517, filed Mar. 15, 2013 (now U.S. Pat. No. 8,974,077)
U.S. patent application Ser. No. 13/836,612, filed Mar. 15, 2013 (now U.S. Pat. No. 8,870,410)
U.S. patent application Ser. No. 13/836,710, filed Mar. 15, 2013 (now U.S. Pat. No. 9,062,873)
U.S. patent application Ser. No. 14/137,306, filed Dec. 30, 2013 (now U.S. Pat. No. 8,985,806)
U.S. patent application Ser. No. 14/137,343, filed Dec. 20, 2013 (now U.S. Pat. No. 8,870,413)
U.S. patent application Ser. No. 14/137,380, filed Dec. 20, 2013 (now U.S. Pat. No. 9,068,738)
U.S. patent application Ser. No. 14/630,500, filed Feb. 24, 2015 (now U.S. Pat. No. 9,812,043)
U.S. patent application Ser. No. 14/635,907, filed Mar. 2, 2015 (now U.S. Pat. No. 9,234,642)
U.S. patent application Ser. No. 14/706,634, filed May 7, 2015 (now U.S. Pat. No. 9,212,803)
U.S. patent application Ser. No. 14/968,520, filed Dec. 14, 2015 (now U.S. Pat. No. 9,589,488)
U.S. patent application Ser. No. 14/992,680, filed Jan. 11, 2016 (now U.S. Pat. No. 9,349,307)
U.S. patent application Ser. No. 15/162,278, filed May 23, 2016 (now U.S. Pat. No. 9,734,737)
U.S. patent application Ser. No. 15/208,483, filed Jul. 12, 2016 (now U.S. Pat. No. 9,514,663)
U.S. patent application Ser. No. 15/208,521, filed Jul. 12, 2016 (now U.S. Pat. No. 9,524,661)
U.S. patent application Ser. No. 15/216,562, filed Jul. 21, 2016 (now U.S. Pat. No. 9,659,511)
U.S. patent application Ser. No. 15/216,595, filed Jul. 21, 2016 (now U.S. Pat. No. 9,542,870)
U.S. patent application Ser. No. 15/413,277, filed Jan. 23, 2017 (now U.S. Pat. No. 9,734,738)
U.S. patent application Ser. No. 15/413,306, filed Jan. 23, 2017 (now U.S. Pat. No. 9,732,932)
U.S. patent application Ser. No. 15/429,320, filed Feb. 10, 2017 (now U.S. Pat. No. 9,685,102)
U.S. patent application Ser. No. 15/627,089, filed Jun. 19, 2017 (co-pending)
U.S. patent application Ser. No. 15/676,823, filed Aug. 14, 2017 (now U.S. Pat. No. 9,947,248)
U.S. patent application Ser. No. 15/939,565, filed Mar. 29, 2018 (co-pending)
U.S. patent application Ser. No. 15/969,392, filed May 2, 2018 (co-pending)

TECHNICAL FIELD

The following disclosure relates to lighting systems and, more particularly, to lighting systems using light emitting diodes to externally illuminate signs.

SUMMARY

The present invention, in one aspect thereof, comprises a back panel for use in a light emitting diode (LED) lighting assembly. An extruded substrate formed of a thermally conductive material is provided, the substrate having a plurality of fins extending from a first side of the substrate, each of the fins having a substantially rectangular shape oriented so that a longitudinal axis of the fin is substantially parallel to a longitudinal axis of the substrate. At least some of the fins include a hole formed through the fin to enable heated air to rise through the fins. A plurality of LEDs are mounted on a second side of the substrate, and oriented in a longitudinal orientation with the fins oriented parallel to the bottom edge of a surface to be illuminated, such that heat rises perpendicular to the surface of the fin.

BRIEF DESCRIPTION OF THE DRAWINGS

For a more complete understanding, reference is now made to the following description taken in conjunction with the accompanying drawings in which:

FIG. 2 illustrates one embodiment of a lighting assembly that may be used to light the billboard of FIG. 1;

FIGS. 3A and 3B illustrate one embodiment of a back panel that may be used in the lighting assembly of FIG. 2;

FIGS. 5A, 5B, 5C and 5D illustrate one embodiment of an optics panel that may be used with the lighting assembly of FIG. 2;

FIG. 8A illustrates an embodiment of an LED assembly and an optics panel that may be used with the lighting assembly of FIG. 6;

FIGS. 8B-8J illustrates embodiments of the optics panel of FIG. 8A and optical elements that may be used to form part of the optics panel.

DETAILED DESCRIPTION OF ILLUSTRATIVE EMBODIMENTS

Billboards, such as those commonly used for advertising in cities and along roads, often have a picture and/or text that must be externally illuminated to be visible in low-light conditions. As technology has advanced and introduced new lighting devices such as the light emitting diode (LED), such advances have been applied to billboards. However, current lighting designs have limitations and improvements are needed. Although billboards are used herein for purposes of example, it is understood that the present disclosure may be applied to lighting for any type of sign that is externally illuminated.

Figure 1A:
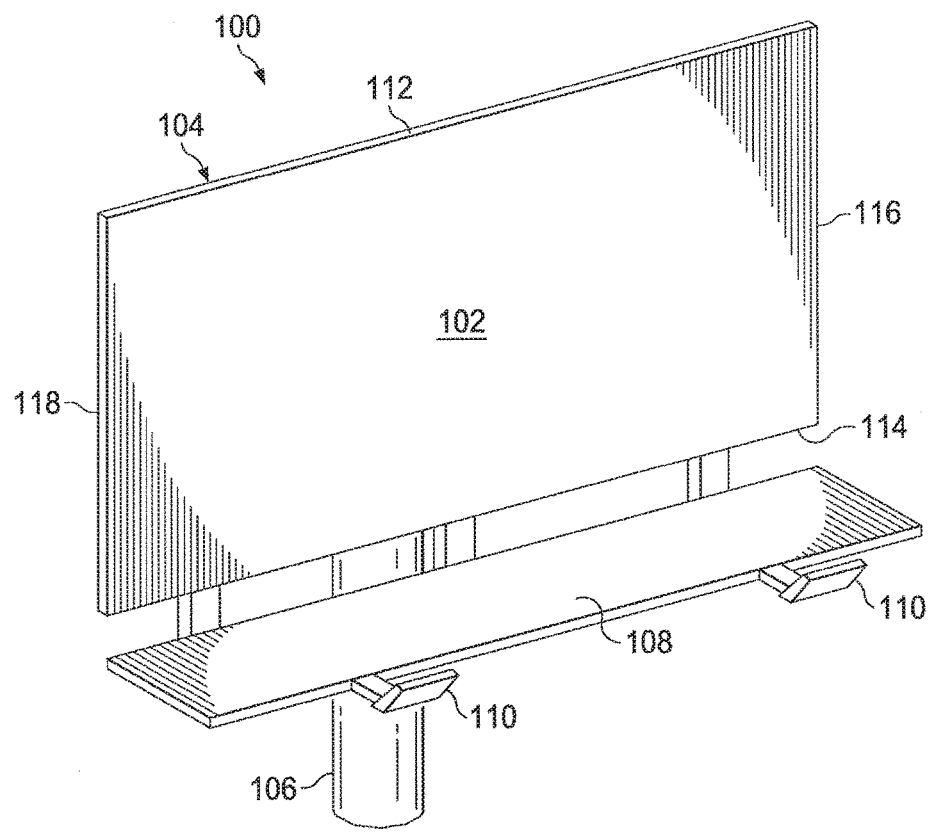
FIG. 1A illustrates one embodiment of a billboard that may be externally lighted by one or more lighting assemblies.

Referring to FIG. 1A, one embodiment of a billboard 100 is illustrated. The billboard 100 includes a surface 102 onto which a picture and/or text may be painted, mounted, or otherwise affixed. The surface 102 may be any size, such as a commonly used size having a width of forty-eight feet wide and a height of fourteen feet. The surface 102 may be provided by placing a backing material on a frame 104 made of steel and/or other materials. The frame 104 may be mounted on one or more support poles 106, which may be considered part of the frame 104 or separate from the frame 104. The billboard 100 may include a walkway or other support structure 108 that enables the surface 102 to be more easily accessed.

One or more lighting assemblies 110 may be coupled to the walkway 108 (e.g., to a safety rail or to the walkway itself) and/or to another structural member of the billboard 100 to illuminate some or all of the surface 102 in low light conditions. The lighting assembly 110 may be mounted at or near a top edge 112 of the billboard 100, a bottom edge 114 of the billboard 100, a right edge 116 of the billboard 100, and/or a bottom edge 118 of the billboard 100. The lighting assembly 110 may be centered (e.g., located in approximately the center of the billboard 100) or off center as illustrated in FIG. 1A.

Figure 1B:
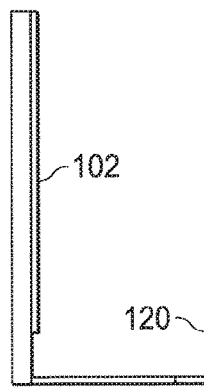
FIGS. 1B-1D illustrate embodiments of angular positions of the lighting assembly of FIG. 1 relative to the billboard.
Figure 1C:
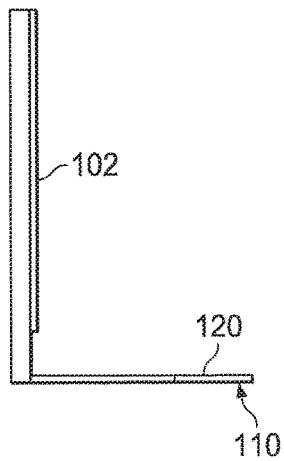
Figure 1D:
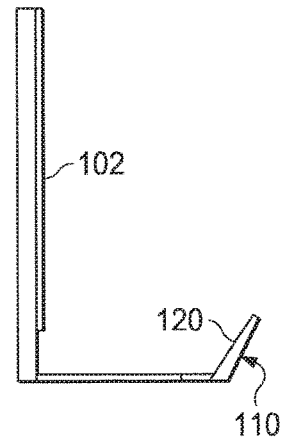

With additional reference to FIGS. 1B-1D, a surface 120 of the lighting assembly 110 may be parallel with respect to the surface 102 of the billboard 100 (FIG. 1B), may be perpendicular with respect to the surface 102 (FIG. 1C), or may be angled with respect to the surface 102 (FIG. 1D). It is understood that the lighting assembly 110 may be placed in many different orientations and locations relative to the billboard 100 and to one another, and the illustrated positions are only for purposes of example. Furthermore, it is understood that references to "top," "bottom," "left," and "right" are used in the present disclosure for purposes of description and do not necessarily denote a fixed position. For example, the billboard 100 may be turned on end, and the referenced "top," "bottom," "left," and "right" edges may still be readily identifiable although the "top" edge would be the "left" edge or the "right" edge.

One problem with current lighting technology is that it can be difficult to direct light only onto the surface 102 and even more difficult to do so evenly. This may be due partly to the placement of the lighting assembly 110, as shown in FIGS. 1B-1D. As the lighting assembly 110 is off center relative to the surface 102, light emitted from the lighting assembly 110 may not evenly strike the surface 102. One problem with uneven illumination is that certain parts of the surface 102 may be more brightly illuminated than other parts. This creates "hot spots" that may be undesirable. Attempting to evenly illuminate the surface 102 may cause light to be directed past the edges 112, 114, 116, and 118 as attempts are made to balance out hot spots in particular areas. However, light that does not strike the surface 102 is wasted and may create problems (e.g., light pollution), as well as waste illumination that could be used for the surface 102.

In addition to the difficulties of evenly illuminating the surface 102, the use of LEDs in an exterior lighting environment involves issues such as heat dissipation and protecting the LEDs against environmental conditions such as moisture. The presence of moving mechanical features such as fans that may be used to provide increased airflow for cooling may create additional reliability problems. Due to the difficulty and expense of replacing and/or repairing the lighting assembly 110 in combination with the desire to provide consistent lighting while minimizing downtime, such issues should be addressed in a manner that enhances reliability and uptime.

Referring to FIG. 2, one embodiment of a lighting assembly 200 is illustrated. The lighting assembly 200 provides a more detailed embodiment of the lighting assembly 110 of FIG. 1. The lighting assembly 200 includes a back panel 202, a light panel 204 (e.g., a printed circuit board (PCB)) having a plurality of LEDs (not shown) mounted thereon, and an optics panel 206. As will be described below in more detailed examples, light from the LEDs of the light panel 204 may be directed by the optics panel 206 to illuminate the surface 102 of the billboard 100 of FIG. 1. The back panel 202 may be configured to serve as a supporting substrate for the light panel 204 and optics panel 206, as well as to dissipate heat produced by the LEDs.

It is understood that any of the back panel 202, light panel 204, and optics panel 206 may actually be two or more physical substrates rather than a single panel as illustrated in FIG. 2. Furthermore, it is understood that there may be additional panels positioned behind the back panel 202, in front of the optics panel 206, and/or between the back panel 202 and light panel 204 and/or between the light panel 204 and optics panel 206.

Figure 3C:
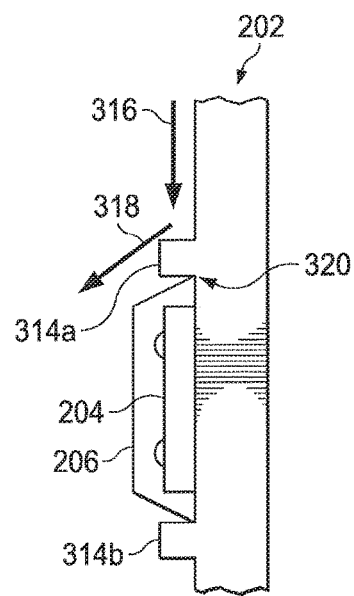
FIG. 3C illustrates one embodiment of the back panel of FIGS. 3A and 3B with a light panel and an optics panel that may also be used in the lighting assembly of FIG. 2.

Referring to FIGS. 3A-3C, one embodiment of the back panel 202 is illustrated with a front surface 302 and a back surface 304. The back panel 202 includes a top edge 306, a bottom edge 308, a right edge 310, and a left edge 312. The panel 202 may be formed of one or more thermally conductive materials (e.g., aluminum) and/or other materials.

The front surface 302 provides a mounting surface for the light panel 204. In some embodiments, the front surface 302 of the panel 202 may include one or more protrusions 314a and 314b that are substantially parallel to the top edge 306. The protrusions 314a and 314b may be configured to protect the light panel 204 from moisture. Although only two protrusions 314a and 314b are illustrated, it is understood that a single protrusion may be provided or three or more protrusions may be provided. Furthermore, such protrusions may vary in length, shape (e.g., may have angled or curved surfaces), orientation, and/or location on the front surface 302.

Referring specifically to FIG. 3C, a light panel 204 and an optical panel 206 may be mounted under the protrusion 314a (FIG. 3C). Moisture running down the front surface 302 in the direction of arrow 316 may strike the protrusion 314a and be directed away from the light panel 204 and optical panel 206 as shown by arrow 318. Although not shown, moisture may also be directed length down the protrusion 314a. Accordingly, protrusion 314a may serve as a gutter and aid in directing moisture away from a joint 320 where the optical panel 206 abuts the front surface 302. This may be beneficial even when a moisture resistant compound is used to seal the joint 320. In embodiments where there are multiple light panels 204 arranged vertically on the front surface 302, there may be a protrusion positioned above each light panel 204. For example, the protrusion 314a may be positioned directly above one light panel 204 and the protrusion 314b may be positioned directly above another light panel 204.

Referring specifically to FIG. 3B, the back surface 304 may be configured to increase heat dissipation. For example, the back surface 304 may be configured with a heat sink provided by fins 322a-322N, where N denotes a total number of fins. The fins 322a-322N increase the surface area of the back surface 304, thereby providing for additional heat dissipation to the surrounding air. The fins 322a-322N may be formed as part of the panel 202 or may be otherwise coupled to the panel 202 (e.g., may be part of a discrete heat sink that is coupled to the back surface 304). Some or all of the fins 322a-322N may be angled, as shown by fins 322a and 322b. In some embodiments, holes (not shown) may be provided in some or all of the fins 322a-322N to aid in air circulation. In such embodiments, the holes may cause a chimney effect in which heated air rises through the holes and is replaced by cooler air. This may be particularly effective in environments where natural air movement is limited.

Figure 4B:
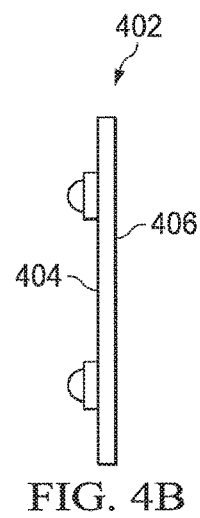
FIGS. 4A and 4B illustrate one embodiment of a light panel that may be used with the lighting assembly of FIG. 2.
Figure 4A:
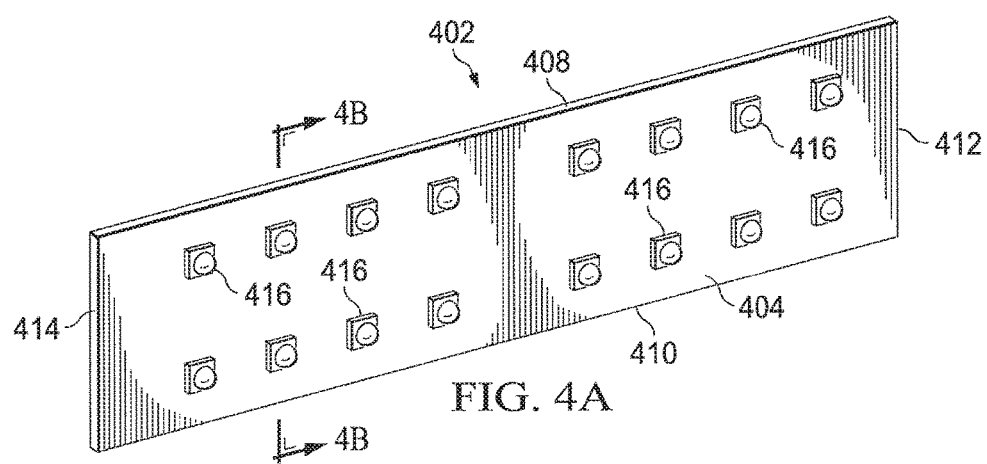

Referring to FIGS. 4A and 4B, one embodiment of a single PCB 402 of the light panel 204 is illustrated. In the present example, the light panel 204 may include multiple PCBs 402, although it is understood that any number of PCBs may be used based on design issues such as the amount of illumination needed, the amount of illumination provided by a single PCB 402, the size of the surface 102 of the billboard 100, and/or other factors. As shown in the present embodiment with a substantially rectangular cross-section, the PCB 402 includes a front surface 404, a back surface 406, a top edge 408, a bottom edge 410, a right edge 412, and a left edge 414.

The PCB 402 may include one or more strings of LEDs 416, with multiple LEDs 416 in a string. For example, a string may include eight LEDs 416 and each PCB 402 may include two strings for a total of sixteen LEDs 416. In this configuration, a light panel 204 having eight PCBs 402 would include ninety-six LEDs 416. It is understood that although the PCBs 402 are shown as being substantially identical, they may be different in terms of size, shape, and other factors for a single light panel 204.

In the present example, the LEDs 416 are surface mounted, but it is understood that the LEDs 416 may be coupled to the panel 204 using through hole or another coupling process. The surface mounted configuration may ensure that a maximum surface area of each LED 416 is in contact with the PCB 402, which is in turn in contact with the back panel 202 responsible for heat dissipation. Each string of LEDs may receive a constant current with the current divided evenly among the LEDs 416.

Referring to FIGS. 5A, 5B, 5C and 5D, one embodiment of a single lens panel 500 of the optics panel 206 is illustrated. In the present example, the optics panel 206 may include multiple lens panels 500, although it is understood that any number of lens panels may be used based on design issues such as the number, arrangement, and orientation of the LEDs 416, the size of the surface 102, and/or other factors. As shown in the present embodiment with a substantially rectangular cross-section that is configured for use with the PCB 402 of FIG. 4, a single lens panel 500 includes a front surface 502, a back surface 504, a top side 506, a bottom side 508, a right side 510, and a left side 512. The sides 506, 508, 510, and 512 may form a cavity into which the PCB 402 may fit, thereby providing protection for the PCB 402 from environmental conditions such as moisture.

The lens panel 500 may include a beveled or angled top side 506 and/or bottom side 508 as illustrated in FIG. 5B. The beveling/angling may aid in preventing moisture from reaching the PCB 402 under the lens panel 500, as water will more readily flow from the area of the joint 320 (FIG. 3C) due to the angled surface than if the top side 506 was relatively flat.

The lens panel 500 may include multiple optical elements 514. A single optical element 514 may be provided for each LED 416, a single optical element 514 may be provided for multiple LEDs 416, and/or multiple optical elements 514 may be provided for a single LED 416. In some embodiments, the optical elements 514 may be provided by a single multi-layer optical element system provided by the lens panel 500.

In the present example, the optical elements 514 are configured so that the light emitted from each LED 416 is projected onto the entire surface 102 of the billboard 100. In other words, if all other LEDs 416 were switched off except for a single LED 416, the entire surface 102 would be illuminated at the level of illumination provided by the single LED 416. In one embodiment, the rectangular target area of the surface 102 would be evenly illuminated by the LED 416, while areas beyond the edges 112, 114, 116, and 118 would receive no illumination at all or at least a minimal amount of illumination from the LED 416. What is meant by "evenly" is that the illumination with a uniformity that achieves a 3:1 ratio of the average illumination to the minimum. Thus, by designing the lens in such a manner, when all LEDs are operating, the light form the collective thereof will illuminate the surface at the 3:1 ratio. When one or more LEDs fail, the overall illumination decreases, but the uniformity maintains the same uniformity. Also, as described hereinabove, the "surface" refers to the surface that is associated with a particular LED panel. It may be that an overall illuminated surface is segmented and multiple panels are provided, each associated with a particular segment.

FIG. 5C illustrates a detail of the lens assembly. Each of the diodes 416 is mounted on the board 408 at a minimum distance. Overlying the board and LEDs 416 is transparent lens substrate 520. This substrate 520 has a plurality of lens structures 522, each associated with one of the LEDs 416, such that each of the LEDs 416 has the light emitted therefrom directed outward towards the surface, each lens structure being substantially the same. The minimum distance is designed such that overlapping light from adjacent LEDs does not create interference patterns and result in dead spots on the surface. The lens structure 522 is designed to create the 3:1 uniformity and also, the lens structure is designed to "direct" the light from an edge of the surface to cover the entire surface. This is shown by the angle of the light rays in FIG. 5C. Also, the beveled edge 530 will basically surround the PCB 402, thus protecting it from moisture. The lens substrate 520 is secured with screws (not shown).

FIG. 5D illustrates a detail of the lens structure 522. This structure includes an interior surface 524 and an exterior surface 526 that shapes and directs the light in the correct pattern. This is an acrylic material. With such a design, the lighting assembly can be disposed at an edge of the surface to illuminate the entire surface.

In some embodiments, as shown in FIG. 1, two lighting assemblies 110 may be used. Each lighting assembly may be powered by a separate power supply (not shown), and may be configured to illuminate the entire surface 102. In such an embodiment, if one power supply fails, the remaining lighting assembly 110 will still illuminate the entire surface 102, although at a lesser intensity than when both lighting assemblies 110 are functioning. This provides evenly distributed illumination when both lighting assemblies 110 are functioning correctly, and continues to provide evenly distributed illumination when one lighting assembly 110 malfunctions. Accordingly, the entire surface 102 of the billboard 100 may be illuminated even when an entire lighting assembly 110 has malfunctioned and is providing no illumination at all due to the redundancy provided by configuration of the lighting assemblies 110.

Furthermore, in some embodiments as described above, each LED 416 of a single lighting assembly 110 may be configured via the optical elements 514 to illuminate the entire surface 102. In such embodiments, if one or more LEDs 416 or strings of LEDs fails, the remaining LEDs 416 will still illuminate the entire surface 102, although at a lesser intensity than when the failed LEDs 416 are functioning. This provides evenly distributed illumination when all LEDs 416 are functioning correctly, and continues to provide evenly distributed illumination when one or more LEDs are malfunctioning. Accordingly, the billboard 100 may be illuminated even when multiple LEDs 416 have malfunctioned and are providing no illumination at all due to the redundancy provided by configuration of the lighting assemblies 110.

It is understood that some embodiments may direct substantially all illumination from a lighting assembly 110 evenly across the surface 102 while some illumination is not evenly distributed. For example, substantially all LEDs 416 may be directed to each evenly illuminate the surface 102 with the exception of a relatively small number of LEDs 416. In such cases, the illumination provided by the remaining LED or LEDs 416 may be directed to one or more portions of the surface 102. If done properly, this may be accomplished while minimizing any noticeable unevenness in the overall illumination, even if one of the remaining LEDs 416 malfunctions. For example, the lighting assembly 110 may be configured to direct the illumination provided by one LED 416 to only the left half of the surface 102, while directing the illumination from another LED 416 to only the right half of the surface 102. The loss of one of these two LEDs may not noticeably impact the illumination of the surface 102. It is understood that such variations are within the scope of this disclosure.

In embodiments where the illumination is evenly distributed across the surface 102, it is understood that the optics panel 206 may be configured specifically for the light panel 204 and the surface 102. For example, assuming the surface 102 is forty-eight feet wide and sixteen feet high, the lens panel 500 of FIG. 5 may be specifically designed for use with the PCB 402 of FIG. 4. This design may be based on the particular layout of the PCB 402 (e.g., the number and arrangement of the LEDs 416), the amount of illumination provided by the LEDs 416, the size of the surface 102, the distance between the lens panel 500 and the surface 102, the angle at which the lens panel 500 is mounted relative to the surface 102 (e.g., FIGS. 1B-1D), and/or other factors. Accordingly, changes in any of these factors may entail a change in the design of the lens panel 500 in order to again evenly distribute the illumination provided by each LED 416 across the entire surface 102. It is understood that various standard configurations of the lighting assembly 110 may be developed for various billboard and/or other externally illuminated signs so that a particular configuration may be provided based on the parameters associated with a particular billboard and/or externally illuminated sign.

Figure 6A:
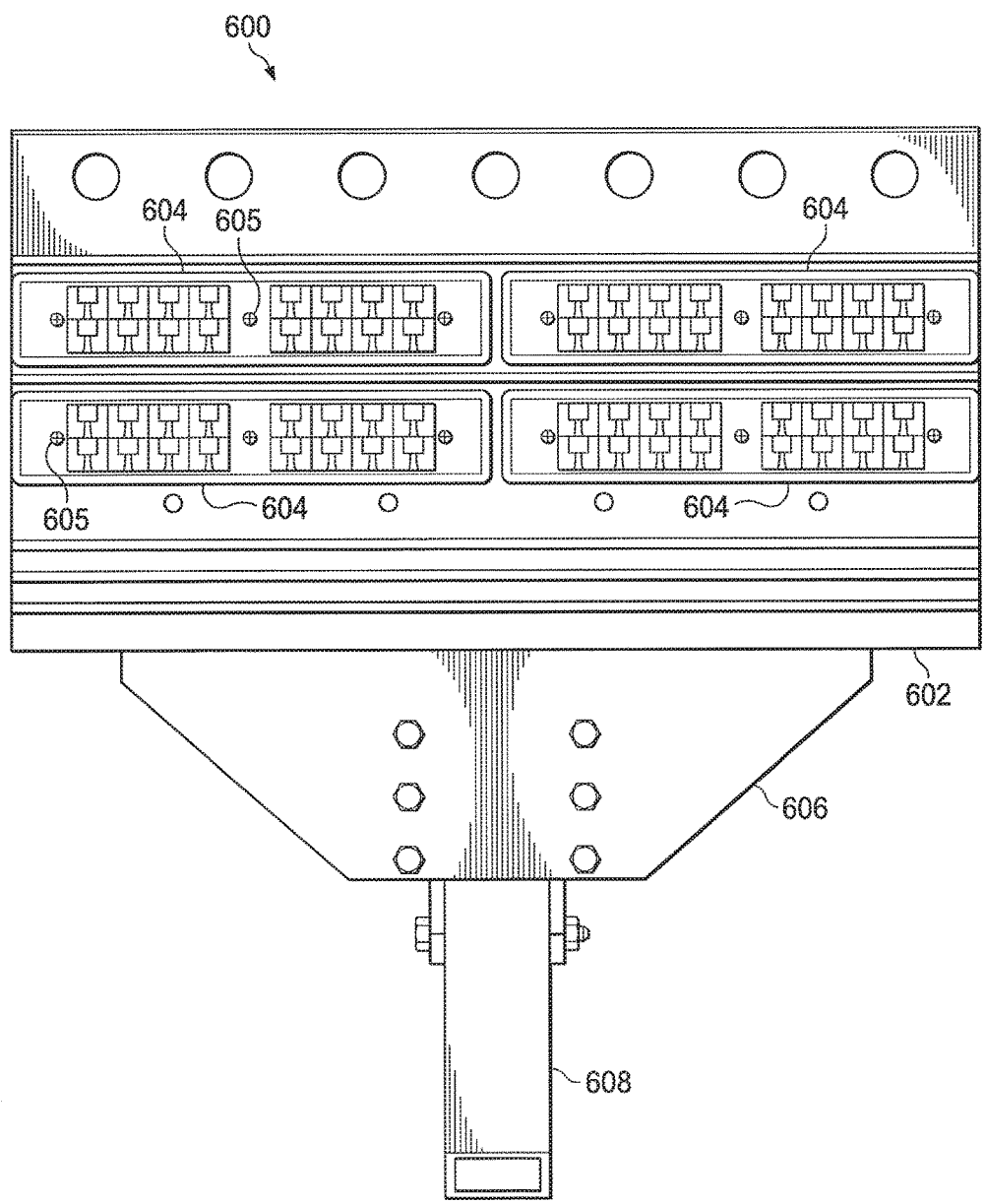
FIGS. 6A-6C illustrate a more detailed embodiment of the lighting assembly of FIG. 2.
Figure 6B:
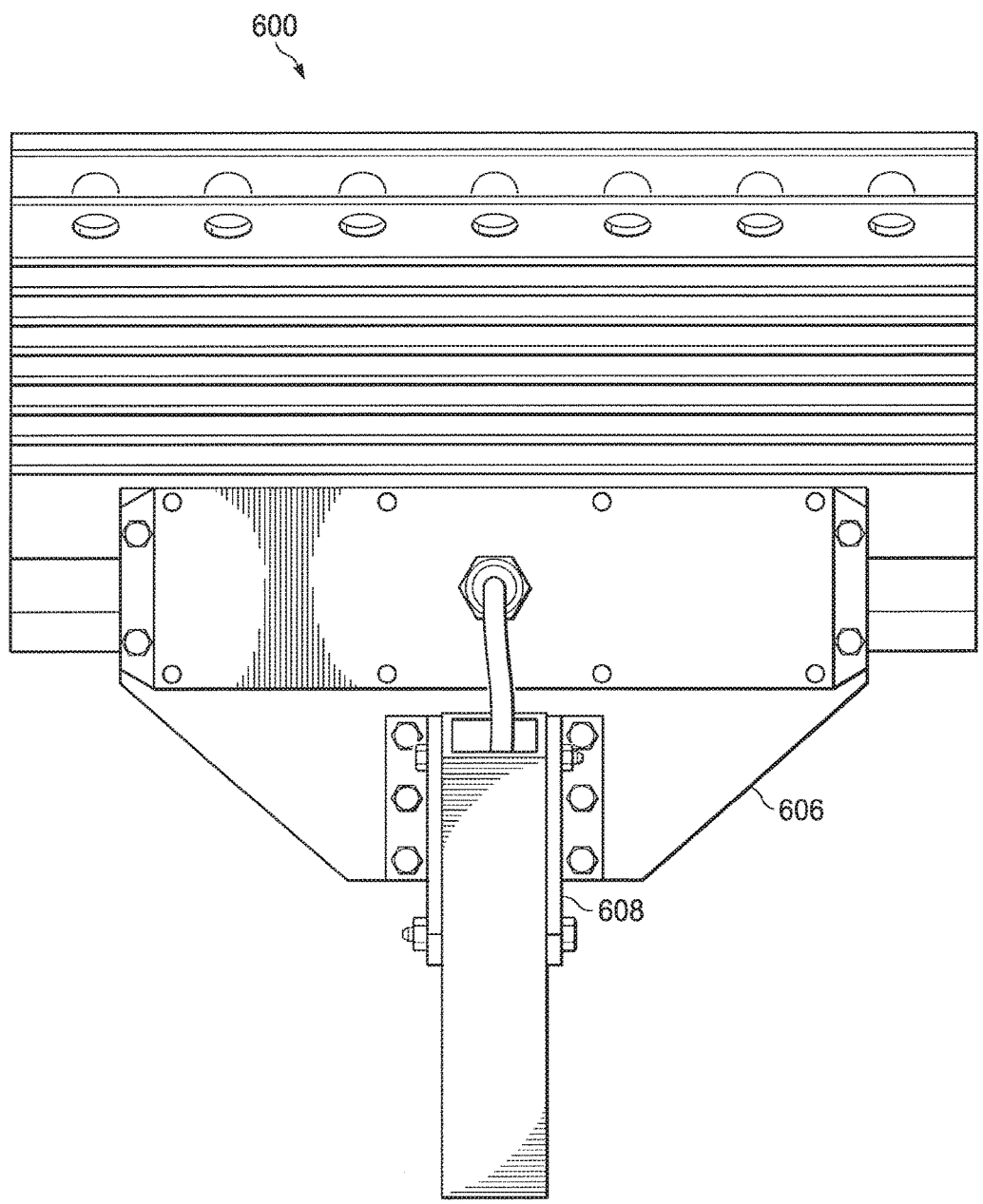
Figure 6C:
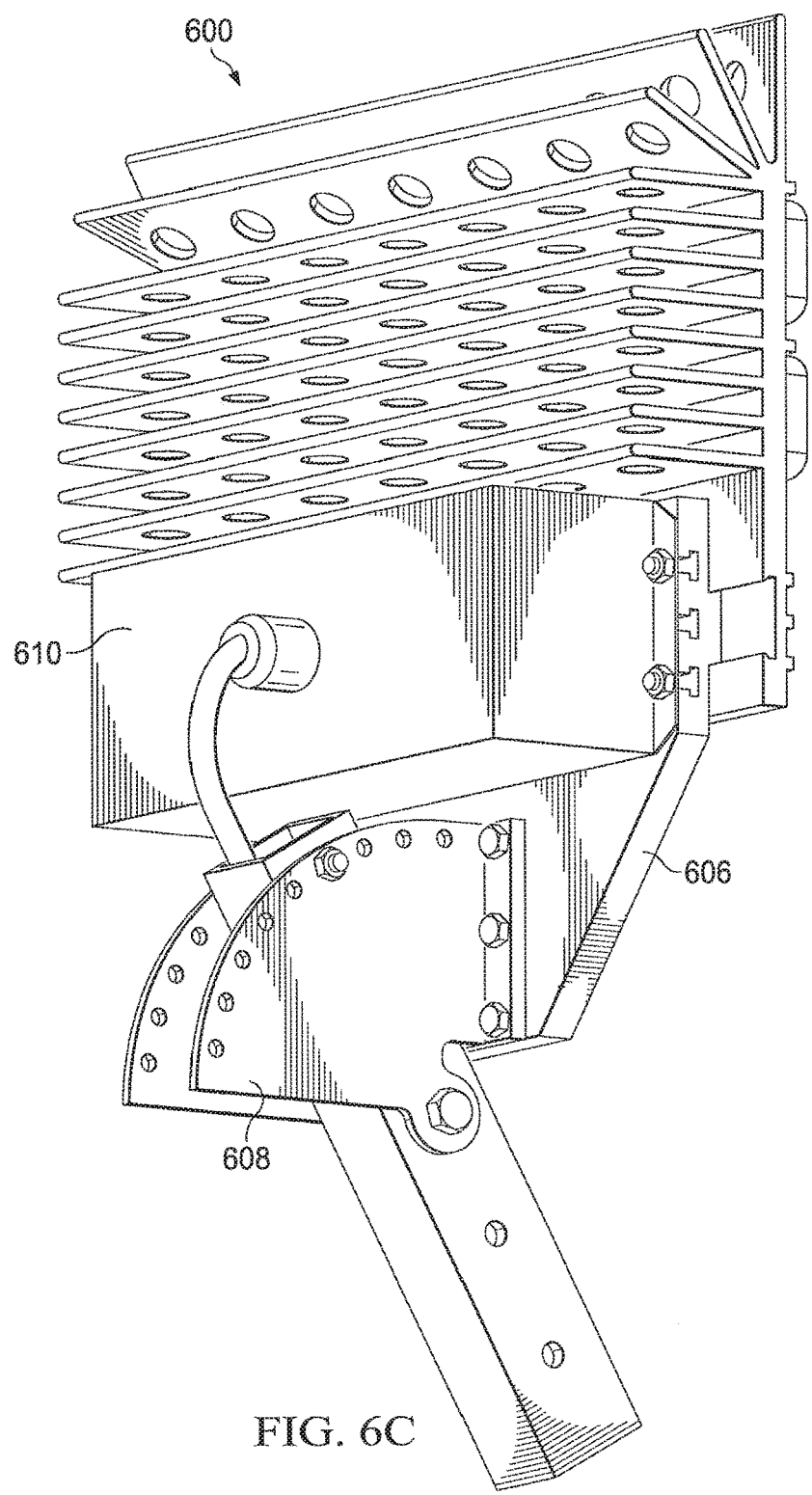

Referring to FIGS. 6A-6C, one embodiment of a lighting assembly 600 is illustrated that provides a more detailed embodiment of the lighting assembly 200 of FIG. 2. The lighting assembly 600 includes a back panel 602, a light panel formed by multiple LED assemblies (denoted by reference number 800 in FIG. 8A), and an optics panel formed by multiple lens panels 604. Accordingly, as described previously, the light panel 204 in the current example is represented by multiple LED assemblies 800 and the optics panel 206 is represented by multiple lens panels 604. In the present embodiment, the lighting assembly 600 includes four LED assemblies 800 and four lens panels 604.

Although various attachment mechanisms (e.g., threaded screws, bolts, and/or other fasteners) may be used to coupled the lens panels and LED assemblies to the back panel 602, the present embodiment uses multiple threaded fasteners 605 (e.g., screws) that extend through the lens panels and the LED assemblies and engage threaded holes in the back panel 602.

The lighting assembly 600 is also illustrated with a mounting plate 606 that couples to the back panel 602 and to an adjustable mounting bracket 608. The adjustable mounting bracket 608 may be used to couple the lighting assembly 600 to a portion of the billboard 100 (FIG. 1) and/or to another support member. A power supply enclosure 610 may be coupled to the mounting plate 606 and configured contain a power supply (not shown) capable of supplying power to LEDs of the LED assemblies 800. It is noted that separating the power supply from the back panel 602 may aid in heat dissipation by the back panel 602 as it does not have to dissipate heat from the power supply to the same extent as if the power supply was mounted directly to the back panel 602.

The location of the power supply may also be beneficial as snow not melted by the heat produced by the LED may be melted by heat produced by the power supply. This may aid in reducing snow buildup on the LEDs.

Figure 7A:
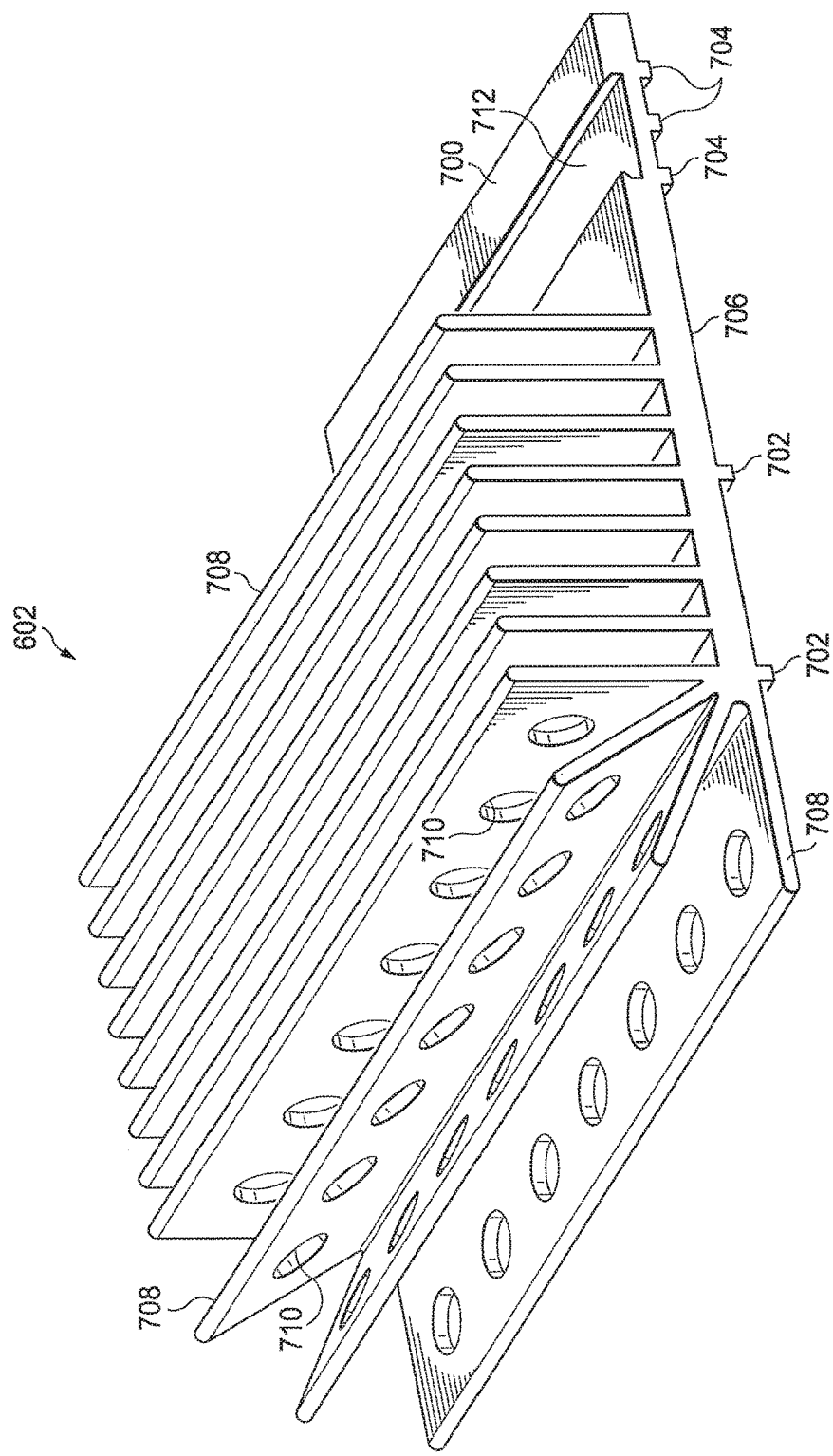
FIGS. 7A and 7B illustrate an embodiment of a back panel that may be used with the lighting assembly of FIGS. 6A-6C.
Figure 7B:
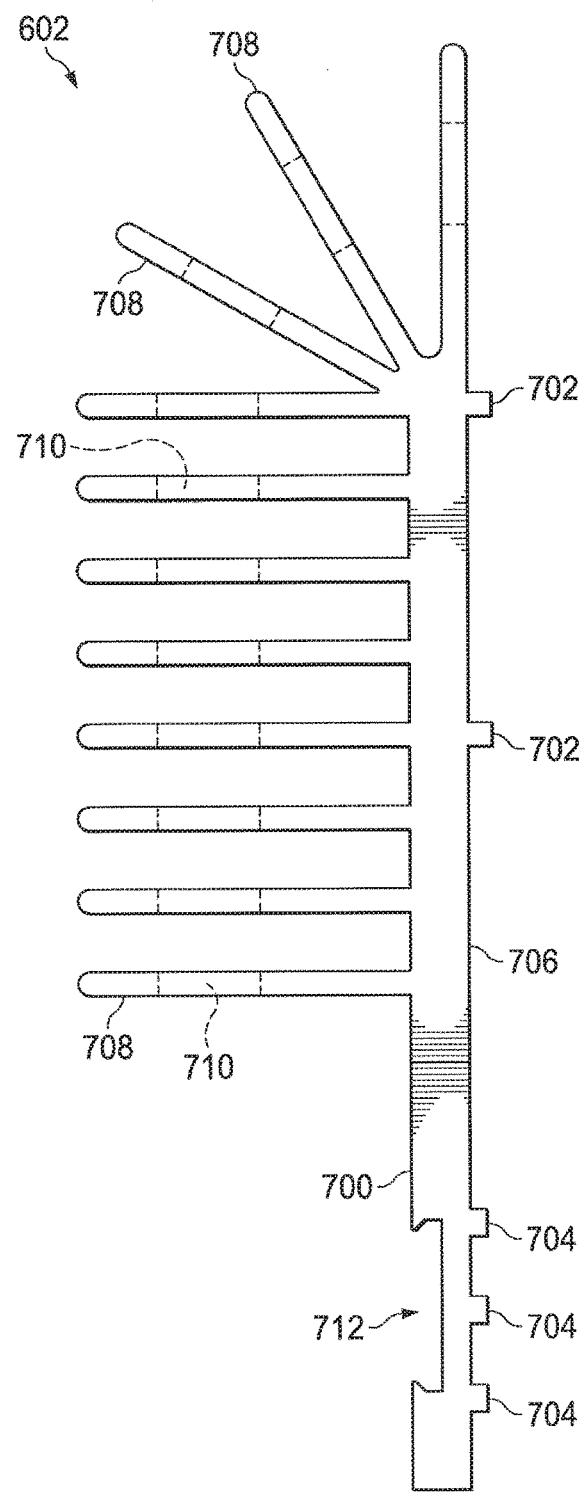

With additional reference to FIGS. 7A and 7B, one embodiment of the back panel of FIG. 602 is illustrated. A front surface 700 includes multiple protrusions 702 that may be configured to protect the light panels (not shown) against moisture as previously described. The front surface 700 may include additional protrusions 704.

A back surface 706 includes multiple fins 708 that form a heat sink to aid in the dissipation of heat from the back panel 602. In the present example, the fins 708 are substantially rectangular in shape. In the present example, the back panel 602 is extruded and the fins 708 run parallel to the top edge with a longitudinal axis of each fin 708 being substantially parallel to a longitudinal axis of the back panel 602. Forming the fins 708 in a vertical manner is possible, but may increase the cost of the back panel 602 due to the extrusion process. As shown, the fins 708 may be substantially perpendicular to the back surface 706, and/or may be angled. In the present example, the fins 708 are angled such that near the top of the back panel 702, the fins 708 are angled towards the top.

Because the fins 708 are parallel to the top edge, heat may be trapped due to its inability to rise vertically. Accordingly, holes 710 may be present in some or all of the fins 708 (marked but not actually visible in the side view of FIG. 7B) to provide paths for the heat to rise vertically in spite of the orientation of the fins 708. The holes 710 may create a chimney effect that increases air flow across the fins 708 and aids in the cooling process. In some embodiments, some or all of the fins 708 may be angled such that heat is not trapped.

The back surface 706 may also include a groove 712 that is configured to receive a tongue of the mounting plate 606 in a tongue-in-groove manner.

With additional reference to FIGS. 8A-8J, embodiments of a single LED assembly 800 and a single lens panel 604 that may be used with the lighting assembly 600 are illustrated. As shown, the single LED assembly 800 and the single optics panel 604 may be configured for use together.

Referring specifically to FIG. 8A, the LED assembly 800 includes a substrate 802 (e.g., a PCB) onto which are mounted multiple LEDs 804. In the present example, the LED assembly 800 includes two strings of eight LEDs 804 each for a total of sixteen LEDs 804. It is understood that this is merely an example, and there may be more or fewer LEDs 804 on the light panel 800, and the LEDs 804 may be arranged in many different ways on the substrate 802.

Referring also to FIGS. 8B-8J, the optics panel 604 may include optical elements 806 arranged on an upper surface 808 of the optics panel 604. The optics panel 604 may further include sides 810, 812, 814, and 816 that are configured to fit around the edge of the substrate 802 of the light panel 800. The bottom edge of each side 810, 812, 814, and 816 abuts the front surface 700 of the back panel 602 and may be sealed to the front surface 700 using a moisture resistant sealant.

As shown in FIGS. 8D-8H, a single optical element 806 may include multiple lens elements designed to distribute the illumination provided by a single LED 804 across a surface such as the surface 102 of FIG. 1. A first lens element 820 may be positioned proximate to the LED 804, and additional lens elements 822, 824, and 826 may be positioned above the lens element 820. Multiple optical elements 806 may be combined and formed as a single optics panel 604 that is configured to operate with the LED assembly 800.

Figure 9:
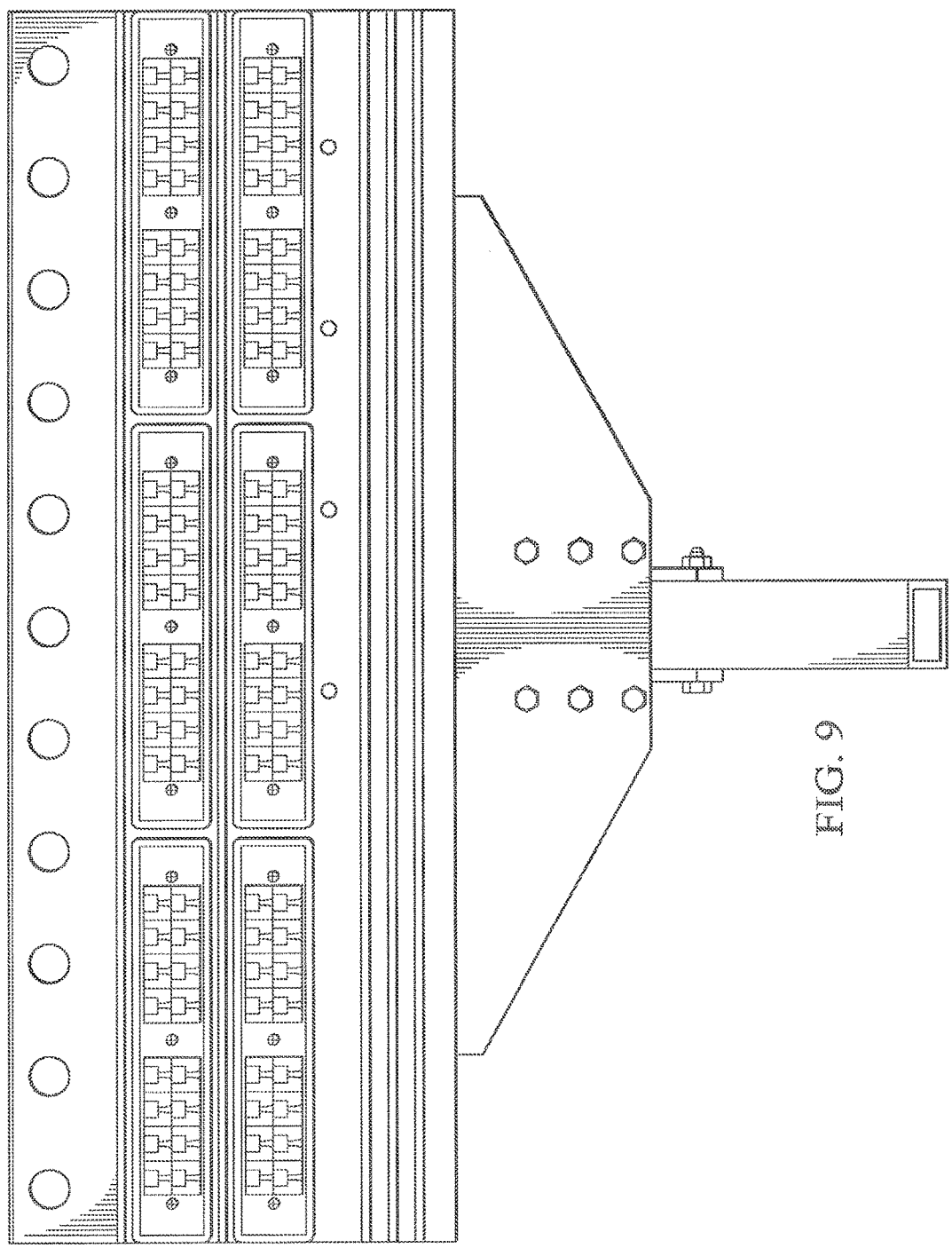
FIG. 9 illustrates a more detailed embodiment of the lighting assembly of FIG. 2.

Referring to FIG. 9, another embodiment of a lighting assembly 900 is illustrated that provides a more detailed embodiment of the lighting assembly 200 of FIG. 2. The lighting assembly 900 is similar to the lighting assembly 600 of FIG. 6, but includes six LED assemblies rather than the four six LED assemblies of the lighting assembly 600. It is understood that the lighting assembly 900 may require a larger power supply than the lighting assembly 600 (e.g., a one hundred and fifty watt power supply instead of a one hundred and twenty watt power supply).

Although the preferred embodiment has been described in detail, it should be understood that various changes, substitutions and alterations can be made therein without departing from the spirit and scope of the invention as defined by the appended claims.

What is claimed is:

1. A light assembly comprising:
  a thermally conductive support structure with an attachment point for securing the support structure to a supporting element;
  a heat sink;
  a substantially planar circuit board attached to the support structure;
  a plurality of LEDs attached to the circuit board to form an array, the LEDs being thermally coupled to the heat sink; and
  a single transparent substrate overlying all LEDs attached to the circuit board and including a corresponding plurality of optical elements;
  wherein each optical element includes a first portion configured to direct light from the corresponding LED away from the circuit board in a first direction, a second portion configured to direct light from the corresponding LED away from the circuit board in a second direction, and a third portion configured to direct light from the corresponding LED away from the circuit board in a third direction so that the light is directed asymmetrically so as to illuminate a substantially rectangular area that is off-center relative to the light assembly.

2. The light assembly of claim 1, wherein, for each optical element, the second portion intersects with the first portion in a region between the first portion and the second portion, and wherein, for each optical element, the first portion and the second portion are shaped so that at least one surface normal of the first portion intersects with at least one surface normal of the second portion.

3. The light assembly of claim 1, wherein the heat sink includes a plurality of fins and wherein a portion of the heat sink is in direct contact with the support structure.

4. The light assembly of claim 1, further comprising:
  a second substantially planar circuit board attached to the support structure, a main surface of the second circuit board being parallel to a main surface of the circuit board;
  a second plurality of LEDs attached to the second circuit board; and
  a second single transparent substrate overlying all LEDs attached to the second circuit board.

5. The light assembly of claim 1, wherein the attachment point is coupled to an adjustable mount for attaching the support structure to a stationary object, wherein the adjustable mount has an angle of tilt that ranges between 0 degrees and 45 degrees relative to a plane parallel to the first and second directions.

6. A light assembly comprising:
  a thermally conductive support structure with an attachment point for securing the support structure to a supporting element;
  a heat sink;
  a substantially planar circuit board attached to the support structure;
  a plurality of LEDs attached to the circuit board to form an array, the LEDs being thermally coupled to the heat sink; and
  a single transparent substrate overlying all LEDs attached to the circuit board and including a corresponding plurality of optical elements;
  wherein each optical element includes a first portion configured to direct light from the corresponding LED away from the circuit board in a first direction, a second portion configured to direct light from the corresponding LED away from the circuit board in a second direction, and a third portion configured to direct light from the corresponding LED away from the circuit board in a third direction so as to illuminate a substantially rectangular area; and
  wherein the light assembly is configured to direct light from the LEDs towards the area in a manner that does not create hot spots or result in dead spots on the area regardless of whether all of the LEDs of the plurality of LEDs or some of the LEDs of the plurality of LEDs are functional.

7. The light assembly of claim 6, wherein the light assembly is further configured to provide illumination redundancy such that the failure of one to five of the LEDs will cause an illumination level of light emitted from the light assembly to decrease while a uniformity of the light emitted from the light assembly remains substantially the same.

8. The light assembly of claim 7, wherein the light assembly is further configured to provide illumination redundancy such that the average illumination to an area when all LEDs are functional and emitting light is no more than three times the average illumination to the area when two or fewer of the LEDs are not emitting light.

9. A light assembly comprising:
a thermally conductive support structure with an attachment point for securing the support structure to a supporting element;
a heat sink;
a substantially planar circuit board attached to the support structure;
a plurality of LEDs attached to the circuit board to form an array, the LEDs being thermally coupled to the heat sink; and
a single transparent substrate overlying all LEDs attached to the circuit board and including a plurality of optical elements, an outer surface of the transparent substrate being an outer surface of the light assembly;
wherein each optical element includes a first portion configured to direct light from the corresponding LED away from the circuit board in a first direction, a second portion configured to direct light from the corresponding LED away from the circuit board in a second direction, and a third portion configured to direct light from the corresponding LED away from the circuit board in a third direction; and
wherein the light assembly is configured so that the light is directed asymmetrically so as to illuminate a substantially rectangular area that is off-center relative to the light assembly.

10. The light assembly of claim 9, wherein the light assembly is configured to direct light from the LEDs towards an area in a manner that does not create hot spots or result in dead spots on the area regardless of whether all of the LEDs of the plurality of LEDs or some of the LEDs of the plurality of LEDs are functional.

11. The light assembly of claim 9, wherein the transparent substrate is configured to provide illumination redundancy such that the average illumination to an area when all LEDs are functional and emitting light is no more than three times the average illumination to the area when two or fewer of the LEDs are not emitting light.

12. The light assembly of claim 9, wherein the heat sink includes a plurality of fins on a first side of the heat sink.

13. The light assembly of claim 9, wherein the single transparent substrate is attached to the circuit board, wherein the substrate when attached to the circuit board is configured to prevent a substantial amount of water from directly contacting a first surface of the circuit board.

14. The light assembly of claim 9, wherein:
the single transparent substrate includes a first plurality of holes;
the heat sink includes a second plurality of holes; and
the light assembly further comprises a plurality of screws, wherein the screws attach the single transparent substrate to the heat sink by being fastened through the first of plurality holes of the substrate to the second plurality of holes in the heat sink.

15. The light assembly of claim 9, further comprising a reflector disposed within the thermally conductive support structure positioned adjacent to the plurality of LEDs, wherein a portion of the reflector has surfaces that are not coplanar with first or second sides of the circuit board, wherein the reflector includes surfaces configured to direct light emitted by each of the LEDs towards a direction away from the first side of the circuit board.

16. A light assembly comprising:
a thermally conductive support structure with an attachment point for securing the support structure to a supporting element;
a heat sink;
a substantially planar circuit board attached to the support structure;
a plurality of LEDs attached to the circuit board to form an array, the LEDs being thermally coupled to the heat sink; and
a single transparent substrate overlying all LEDs attached to the circuit board and including a corresponding plurality of optical elements;
wherein each optical element includes a first portion configured to direct light from the associated LED in a first primary direction away from the circuit board, a second portion configured to direct light from the associated LED in a second primary direction away from the circuit board, and a third portion configured to direct light in a third primary direction away from the circuit board;
wherein the light assembly is configured so that the light is directed asymmetrically in the third direction so as to illuminate a substantially rectangular area that is off-center relative to the light assembly; and
wherein the light assembly is configured to direct light from the LEDs towards an area in a manner that does not create hot spots or result in dead spots on the area regardless of whether all of the LEDs of the plurality of LEDs or some of the LEDs of the plurality of LEDs are functional.

17. The light assembly of claim 16, wherein the light assembly is further configured to provide illumination redundancy such that the average illumination to an area when all LEDs are functional and emitting light is no more than three times the average illumination to the area when two or fewer of the LEDs are not functional and not emitting light.

18. The light assembly of claim 16, wherein the heat sink includes a plurality of fins extending in a direction away from the circuit board.

19. The light assembly of claim 16, wherein a portion of the heat sink is in direct contact with the support structure.

20. The light assembly of claim 16, wherein the heat sink is directly exposed to the outside atmosphere and is not entirely enclosed by the support structure.

21. The light assembly of claim 16, wherein the support structure and the heat sink are portions of a single integral component.

22. The light assembly of claim 16, wherein each optical element overlies a single associated LED and wherein each and every one of the plurality of LEDs has an overlying optical element.

23. The light assembly of claim 16, further comprising:
a second circuit board attached to the support structure;
a second plurality of LEDs attached to the second circuit board; and
a second single transparent substrate overlying all LEDs attached to the second circuit board.

* * * * *